Figure 1:
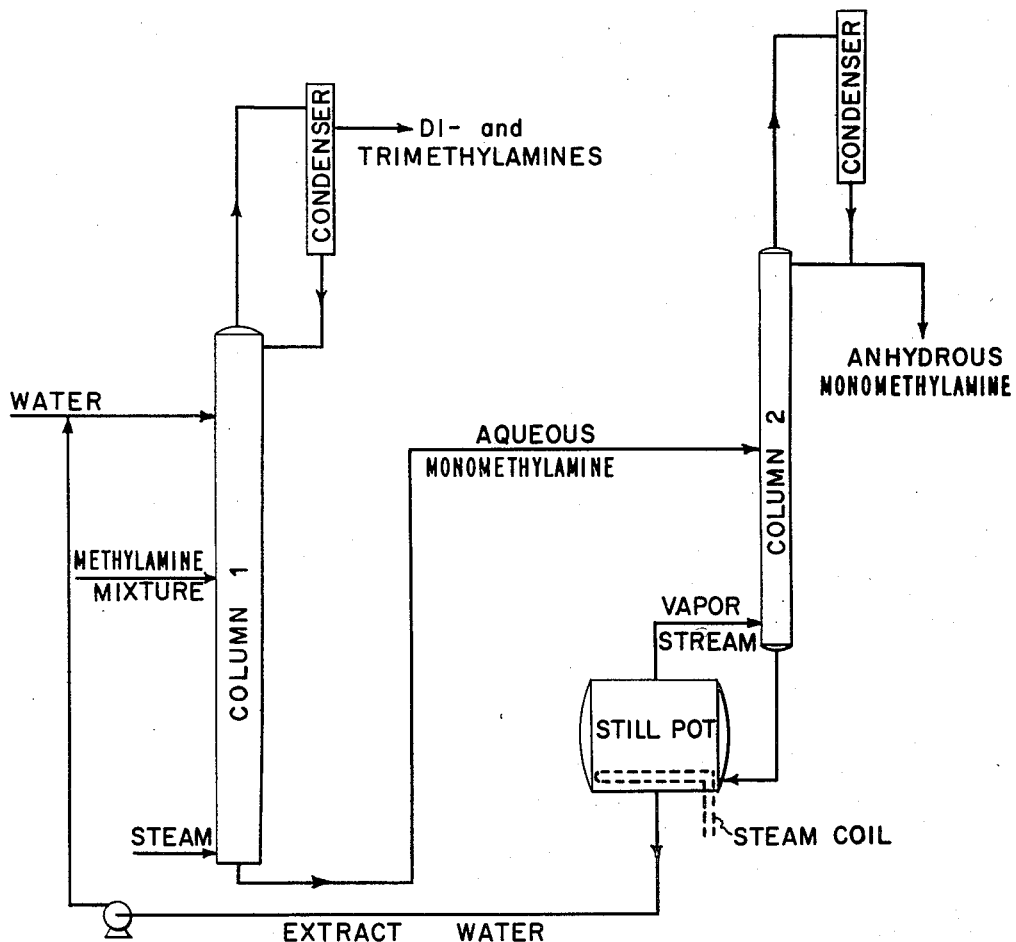

Aug. 19, 1958  C. J. KRAMIS  2,848,386
PROCESS FOR SEPARATION OF METHYLAMINES
Filed June 1, 1953  2 Sheets-Sheet 1

INVENTOR
CHARLES J. KRAMIS

BY
C. Harold Herr
ATTORNEY

Aug. 19, 1958 C. J. KRAMIS 2,848,386
PROCESS FOR SEPARATION OF METHYLAMINES
Filed June 1, 1953 2 Sheets-Sheet 2

INVENTOR
CHARLES J. KRAMIS
BY
ATTORNEY

United States Patent Office 2,848,386
Patented Aug. 19, 1958

2,848,386

PROCESS FOR SEPARATION OF METHYLAMINES

Charles J. Kramis, Houston, Tex., assignor to E. I. du Pont de Nemours and Company, Wilmington, Del., a corporation of Delaware Application June 1, 1953, Serial No. 358,983

3 Claims. (Cl. 202—39.5)

This invention relates to extractive distillation processes for continuously separating monomethylamine from mixtures consisting essentially of mono-, di- and trimethylamines.

More particularly, the invention is directed to processes for producing substantially pure monomethylamine by feeding an amine mixture into a distillation column at an intermediate point in the column, concurrently feeding water near the top of the column at a rate such that the quantity of water is sufficient to dissolve the monomethylamine but insufficient to dissolve the di- and trimethylamines, withdrawing monomethylamine and water from the lower portion of the column, and recovering water for recycle either in a second column or from the bottom of the extractive column.

The extractive distillation of amine mixtures with water has heretofore been restricted to the separation of trimethylamine from mixtures of either tri- and dimethylamines or tri- and monomethylamines. Swallen U. S. 2,045,929, for example, teaches that tri- and dimethylamines can be separated by absorbing the dimethylamine in water at pressures up to 30 p. s. i. and displacing from the resulting solution any trimethylamine by scrubbing with a current of gaseous dimethylamine.

Spence, U. S. 2,206,585, separates trimethylamine from mixtures of trimethylamine and dimethylamine by selectively absorbing dimethylamine in water at a temperature of from 10 to 75 degrees centigrade below the boiling point of water at the pressure employed.

I have now discovered that separation of monomethylamine from a mixture of mono-, di- and trimethylamines can be readily effected by a continuous extractive distillation process with water and that this distillation can be carried out at temperatures which are more than 75 degrees centigrade below the boiling point of water at the pressure employed. I have further found that water especially suited for recycle can be recovered from the bottom of the extractive column or in a second column for continuous dehydration of aqueous monomethylamine.

In practicing the processes of the present invention, a methylamine mixture substantially free of ammonia is introduced continuously into a distillation column heated with either open or closed steam, the mixture being fed thru an opening near the center of the column. Concurrently, water is fed continuously to the column near the top thereof. Separation of the monomethylamine from the amine mixture takes place at any operating pressure with some improvement in fractionation as pressure is raised. Economics will generally dictate operation at over 80 pounds per square inch gauge (p. s. i. g.) to permit use of cooling water for condensation of overhead vapors, but below about 200 p. s. i. g. to avoid cost of equipment for higher pressures.

An overhead stream, liquid or vapor, is withdrawn from the top of the column. This stream consists of essentially all of the trimethylamine and dimethylamine fed to the column, some monomethylamine, and less than 5% water.

Aqueous monomethylamine substantially free of di- and trimethylamines may be removed as a liquid from the bottom of the column for use as aqueous monomethylamine or as feed to a second distillation column, preferably operated under pressure, wherein monomethylamine is dehydrated. This separation of monomethylamine from water is effected by distillation, the overhead stream of the second column being substantially pure monomethylamine. The "bottoms" from the second column is water, all or part of which can be used again as "extract water" in the first column. Optionally the monomethylamine can be withdrawn as a vapor or liquid side stream near the bottom of the first column so that all or a portion of the "bottoms," now low in amine content, can be reused as "extract water."

It is to be noted that it is essential to the operation of a process of this invention (1) that the amine mixture is continuously fed into the column at some intermediate point, say, about the center of the column, but always below the water inlet, and (2) that the rate of water inflow is such that the quantity of water present in the column is sufficient to dissolve the monomethylamine but insufficient to dissolve the di- and trimethylamines.

It is preferred that the amine mixture used as a feed to the extractive distillation operation in the practice of this invention contains predominantly monomethylamine. Highly satisfactory results are obtained, for instance, when crude mixtures consisting of about 10% trimethylamine, 2–3% dimethylamine and the remainder monomethylamine are subjected to the process of the present invention. A small amount of ammonia present in the crude amine mixture will not deleteriously affect the separation of monomethylamine from amine mixtures when carried out in accordance with the invention. Such ammonia will "end-up" in the monomethylamine.

The processes of the present invention may be carried out in any suitable distillation apparatus. The inlet for the methylamine mixture should, of course, be positioned below the water inlet and at some intermediate point.

Figure 2:
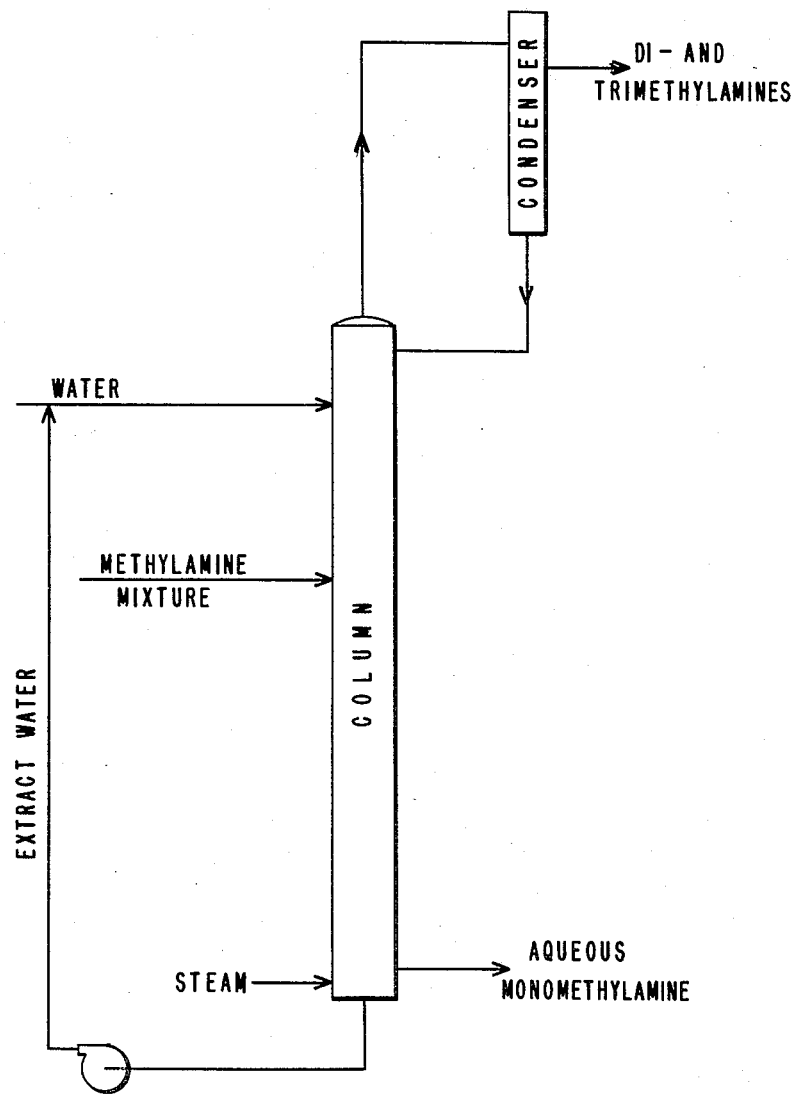

Two arrangements of the apparatus are shown schematically in the accompanying drawings. Figure 1 illustrates the two-column operation of Example 1 and claim 1, while Figure 2 illustrates a one-column operation such as described in Example 2 and set forth in claim 2.

There may be used, for instance, a plate-type rectifying column of the type conventionally used in commercial distillation operations. Such rectifying columns are divided into a series of distillation zones and are adapted to permit the flow of distilled vapors from each zone upward into contact with liquid being distilled in the next preceding zone. Liquid from each distillation zone flow countercurrent to the ascending distilled vapors into the next lower or following distillation zone.

The purity of the monomethylamine will depend on such factors as the design of the distillation columns, the production rate, the composition of the crude amine mixture, the steam rate, the extract water rate and the ratio of production to feed rates. Substantially pure monomethylamine, that is, monomethylamine having less than 2% impurities, can be readily obtained by the processes of the invention.

It will be understood that the critical separation is that between monomethylamine and dimethylamine. The relative volatility between monomethylamine and trimethylamine in an aqueous solution is so high that the amount of trimethylamine in the monomethylamine purified in accordance with the processes of the invention is generally less than one-fifth of the dimethylamine found in the purified monomethylamine.

It is preferred to operate the processes of the present invention such that the rate of monomethylamine production is about 70 to 75% of the amine feed rate to the extractive column provided the feed contains about 85 to 90% monomethylamine. A satisfactory combination of quality and production capacity results.

The processes of the invention are not limited in application to the particular methylamine mixtures given in the examples which follow. They may be applied to any mixture of methylamines low in ammonia content.

Any of a variety of temperatures may be used. The temperatures given in the examples only apply when the stated pressure is employed.

In order to better understand the invention, reference should be had to the following examples:

*Example 1*

A mixture of methylamines consisting essentially of about 87% by weight monomethylamine, about 10% by weight trimethylamine, and from 2 to 3% dimethylamine is fed continuously to the twenty-fourth plate of a fifty-plate fractionating column at a rate of 1200 pounds per hour.

Extract water is introduced concurrently at the forty-sixth plate of the column. The rate of water addition is 2000 pounds per hour. The extract water used at the start-up is fresh. As the process continues in operation, extract water from the "bottoms" of the second column is used.

Open steam at 700 pounds per hour is fed to the bottom of the column.

The extractive distillation column (column #1) is operated at 147 p. s. i. g. and at a temperature of 68.5° C. at the top of the column. At the forty-sixth plate the temperature is 74.5° C. The column pressure drop is 48 inches water.

A liquid overhead stream containing di- and trimethylamine are removed as an overhead stream from column #1 at a rate of 345 pounds per hour.

The "bottoms" from column #1 may be withdrawn for use as an aqueous solution or fed continuously to the middle of a second distillation column operated at 130 p. s. i. g. and at a temperature of 59° C. at the top of the column (70° C. at "mid-column"). If fed to the second column, the "bottoms" of this second column contain water and not more than 7% monomethylamine. The distillate or overhead stream from column #2 is substantially pure monomethylamine, and is collected at a rate of 810 pounds/hour. Its dimethylamine content is less than 1%, its trimethylamine content less than 0.1%.

*Example 2*

Using only the first of the columns described in Example 1, an amine mixture containing 88% by weight monomethylamine, 10% trimethylamine and 2% dimethylamine is introduced continuously into the twenty-fourth plate. The "bottoms" from this column are used as extract water and are pumped to the forty-sixth plate at the rate of 2000 pounds/hour. The monomethylamine is withdrawn as a 50% aqueous solution for use as such or for subsequent dehydration as in the previous example.

I claim:

1. An improved process for producing substantially pure monomethylamine from methylamine mixtures containing predominantly monomethylamine and minor amounts of di- and trimethylamines, which comprises continuously feeding such a mixture to a distillation column at an intermediate point thereof, concurrently feeding extract water at a point above the amine inlet and near the top of the column at a rate such that the quantity of water present in the column is sufficient to dissolve the monomethylamine but insufficient to dissolve the dimethylamine and the trimethylamine, withdrawing di- and trimethylamines from the top of the column, withdrawing aqueous monomethyl amine from the bottom of the column, continuously feeding said aqueous monomethylamine substantially free from di- and trimethylamine to a second distillation column, withdrawing anhydrous monomethylamine from the top of said second column, and withdrawing water containing minor amount of monomethylamine from the bottom of the second column, at least a portion of said water being continuously returned to the first column as extract water.

2. A continuous process for separating monomethylamine from a mixture consisting essentially of monomethylamine, dimethylamine, and trimethylamine which comprises the steps of continuously introducing said mixture into a distillation column at an intermediate point thereof, concurrently feeding extract water near the top of the column at such a rate that the quantity of water present in the column is sufficient to dissolve the monomethylamine but insufficient to dissolve the dimethylamine and the trimethylamine, withdrawing the di- and trimethylamine from the top of the column, withdrawing aqueous monomethylamine as a side stream from the lower portion of the column and returning the bottoms from the column, said bottoms being composed of water low in amine content, to the upper part of the column as extract water.

3. A continuous process for separating monomethylamine from a mixture consisting essentially of monomethylamine, dimethylamine, and trimethylamine which comprises the steps of continuously introducing said mixture into a distillation column at an intermediate point thereof, concurrently feeding water near the top of the column at such a rate that the quantity of water present in the column is sufficient to dissolve the monomethylamine but insufficient to dissolve the dimethylamine and the trimethylamine, withdrawing the di- and trimethylamine from the top of the column, and withdrawing aqueous monomethylamine as a side stream from the lower portion of the column.

References Cited in the file of this patent

UNITED STATES PATENTS

| | | |
|---|---|---|
| 2,045,929 | Swallen | June 30, 1936 |
| 2,180,006 | Hasche et al. | Nov. 14, 1940 |
| 2,206,584 | Spence | July 2, 1940 |
| 2,422,743 | O'Loughlin | June 24, 1947 |
| 2,527,017 | Luten et al. | Oct. 24, 1950 |
| 2,547,064 | Tyerman | Apr. 3, 1951 |
| 2,570,291 | Tyerman | Oct. 9, 1951 |
| 2,595,805 | Morrell et al. | May 6, 1951 |
| 2,612,467 | Morrell et al. | Sept. 30, 1952 |
| 2,638,440 | Drout et al. | May 12, 1953 |
| 2,647,078 | Chambers | July 28, 1953 |